United States Patent [19]

Schwabe et al.

[11] Patent Number: 4,737,537

[45] Date of Patent: Apr. 12, 1988

[54] COLORED SILICONE COMPOSITION

[75] Inventors: Peter Schwabe; Reiner Voigt, both of Leverkusen, Fed. Rep. of Germany

[73] Assignee: Bayer Aktiengesellschaft, Leverkusen, Fed. Rep. of Germany

[21] Appl. No.: 937,687

[22] Filed: Dec. 4, 1986

[30] Foreign Application Priority Data

Dec. 17, 1985 [DE] Fed. Rep. of Germany ....... 3544619

[51] Int. Cl.$^4$ .............................................. C08K 5/01
[52] U.S. Cl. .................................. 524/474; 524/476; 524/481; 524/490
[58] Field of Search ............... 524/474, 476, 481, 490, 524/860, 862

[56] References Cited

U.S. PATENT DOCUMENTS 3,988,285 10/1976 De Vrieze .
4,059,534 11/1977 Morro et al. ................ 252/32.7 R
4,357,438 11/1982 Sattlegger et al. .

*Primary Examiner*—Lewis T. Jacobs
*Attorney, Agent, or Firm*—Connolly & Hutz

[57] ABSTRACT

Colored silicone composition comprising:
 (a) at least one organopolysiloxane,
 (b) at least one isoparaffin having 8 to 24 carbon atoms, and
 (c) a dyestuff soluble in (b).

3 Claims, No Drawings

COLORED SILICONE COMPOSITION

The present invention relates to colored silicone compositions, which may be oils, fats, pastes, resins, emulsions and rubbers as well as masterbatches for these.

BACKGROUND OF THE INVENTION

Silicone compositions or silicone oils which are based on organopolysiloxanes are known and used for a wide variety of applications. They are employed, for example, as greases and lubricants, hydraulic oils, joint sealants, impression compositions, paper release agents and many other uses. See, for example, W. Noll, "Chemie and Technologie der Silicone" (Chemistry and Technology of Silicones), Verlag Chemie, Weinheim 1968.

Apart from the reactants, a very wide variety of components such as fillers, additives, dyes etc., can be incorporated into the silicones, depending on the desired properties of the final products. Colored silicone articles can be prepared by, for example, using so-called color batches of silicone oils and organic and inorganic colored pigments. These colored pigments are finely distributed in silicone compositions, for example by means of dissolvers and/or a roll mill. A substantial disadvantage of these colorpastes lies in the tendency toward sedimentation of the colored pigments in, e.g., oils, the distribution in the silicone compositions which is often poor, and the non-transparency of the final products prepared in this manner. These problems would not occur in dyestuffs which are soluble in silicones, but such dyestuffs are practically unknown.

BRIEF DESCRIPTION OF THE INVENTION

Surprisingly, it has now been found that a number of known dyestuffs can be employed for the tinting of silicones if isoparaffins are added to the silicone compositions. In this way, the dyestuffs which are soluble in the isoparaffins can also be incorporated into the silicone compositions.

The present invention therefore relates to colored silicone compositions containing:
(a) organopolysiloxanes,
(b) isoparaffins having 8 to 24 carbon atoms,
(c) dyestuffs and, if appropriate,
(d) further additives which are known per se.

In the context of the present invention, organopolysiloxanes are taken to mean polydimethylsiloxanes, which can also have other substituents such as, for example, hydroxyl, hydrogen, vinyl, allyl, phenyl, acrylyl, and methacrylyl. Greases, pastes, rubbers, resins, lacquers, coverings, coatings, emulsions etc. are prepared from these base substances in a known fashion.

The isoparaffins (b) contain 8 to 24 carbon atoms in the molecule. Preferably, 2,2,4,4,6,6,8-heptamethylnonane $C_{16}H_{34}$ (isohexadecane) and 2,2,4,4,6,6,8,8,10-nonamethylundecane $C_{20}H_{42}$ (isoeicosane) are employed. However, the unsaturated compounds such as isohexadecene $C_{16}H_{32}$ and isoeicosene $C_{20}H_{40}$ are also suitable.

It will be readily understood that the term isoparaffins includes those compounds having a methyl group attached to the carbon next to the end carbon in a hydrocarbon chain.

A wide variety of organic dyestuffs which are soluble in isoparaffins are suitable as dyestuffs. Examples which may be mentioned are dyestuffs of the styrene-, pyrazolone-, quinophthalone-, naphthazine-, perinone-, anthraquinone-, coumarine thioxanthene-, thioindigo- and azo (mono- or disazo)- dyestuff type or also mixtures of these. Dyestuffs from the Makrolex or Ceres series are preferably used.

The silicone compositions according to the invention are obtained by dissolving the paraffin-soluble dyestuff in isoparaffin and subsequently incorporating this dye solution into the silicone composition with the isoparaffin serving as a solubilizer. The silicone/isoparaffin compatibility can be explained by the "zip-fastener effect" between the methyl side groups of the isoparaffin and the polydimethylsiloxane of the silicone composition, since n-paraffins are insoluble in silicones and float on the surface or exude.

Furthermore, the silicone compositions according to the invention do not exhibit dyestuff sedimentation and can be transparent.

Non-transparent filler-containing silicone compositions can also be colored in this fashion. Pastel-colored products are thereby obtained.

The dyestuffs can be used within a relatively wide concentration range. Normally, about 0.1–3% by weight (if appropriate up to the saturation limit) can be added to the isoparaffin. The isoparaffin can in turn be added to the silicone in amounts of 1 to 30 % by weight, preferably 5–15% by weight. The color of the silicone compositions can be adjusted as desired in this fashion. (The amounts are relative to the total weight).

In addition, isoparaffins can serve as solvents for perfumes and flavorings in silicone compositions.

The colored silicone compositions according to the present invention are useful for the same purposes as prior art silicone compositions. For example, the compositions of the present invention are useful to be employed in greases, lubricants, hydraulic oils, joint sealants, impression compositions, paper release agents and many other uses known to those skilled in the art for silicone compositions.

The following examples, in which the parts indicated denote parts by weight, further describe the invention without limitation.

EXAMPLE 1

0.5 part of Macrolex blue RR is dissolved in 99.5 parts of isoeicosane $C_{20}H_{42}$. A dark blue, clear and permanent solution was produced.

A base component was prepared by mixing 30 parts of the abovementioned dye solution, 45 parts of vinyl-terminated polydimethylsiloxane having a viscosity of 10,000 mPa.s at 20° C. and 25 parts of SiH-group-containing polydimethylsiloxane having a viscosity of 120 mPa.s at 20° C.

The catalyst component was obtained by mixing 30 parts of the abovementioned dye mixture, 69.8 parts of the abovementioned vinyl-terminated polydimethylsiloxane and 0.2 part of a complex of platinum and divinyltetravinyldisiloxane.

Both components were dark blue, clear and stable on storage. They were mixed in the ratio 1:1 and a dark blue, clear rubber which did not exhibit any bleeding of paraffin oil and/or dyestuff on storage on filter paper at 25° C. for one week was obtained by polyaddition crosslinking.

EXAMPLE 2

0.5 part of Macrolex blue RR is dissolved in 99.5 parts of isohexadecane $C_6H_{34}$. A dark blue, clear and permanent solution was produced.

The abovementioned dye solution was mixed into the base and catalyst components as described in Example 1, both components being dark blue, clear and stable on storage. The rubber prepared therefrom was also dark blue and clear and did not demonstrate any discoloration of the filter paper after storage for one week at 25° C.

EXAMPLE 3 (COMPARISON)

0.5 parts of Macrolex blue RR (Solvent blue 97) was dissolved in 99.5 parts of n-paraffin oil with a viscosity of 180 mPa.s at 20° C. A dark blue, clear and permanent solution was produced.

After incorporation of the abovementioned dye solution into the base and catalyst components according to Example 1, blue liquids were obtained which exhibited streaks and dyestuff particles and which had each separated into a pale blue silicone oil layer and a dark blue paraffin oil layer after 5 days' storage at 25° C. The rubber prepared from the freshly prepared base and catalyst components was blue, exhibited dyestuff particles and stained and grease-marked a filter paper after a few minutes.

EXAMPLE 4

30 parts of the dye solution from Example 1 were mixed into 70 parts of hydroxyl-terminated polydimethylsiloxane having a viscosity of 2,000 mPa.s at 20° C. A dark blue and clear liquid which was stable on storage was produced.

10 parts of this liquid were mixed with 1 part of a component consisting of dibutyltin dilaurate and polyethoxysiloxane. The rubber prepared by polycondensation crosslinking was dark blue and clear, and did not discolor the filter paper.

EXAMPLE 5

30 parts of the dye solution from Example 2 and 70 parts of the hydroxyl-terminated polydimethylsiloxane from Example 4 produced, after mixing, a dark blue and clear liquid which was stable on storage.

The rubber prepared according to Example 4 was also dark blue and clear and did not show any discoloration of the underlay after one week storage at 25° C. on the filter paper.

EXAMPLE 6 (COMPARISON)

By mixing 30 parts of the dye solution from Example 3 and 70 parts of the hydroyl-terminated polydimethylsiloxane, a blue liquid was produced which exhibited streaks and dyestuff particles and which had separated into a pale blue silicone layer and a dark blue paraffin oil layer after storage for 5 days at 25° C.

The rubber prepared according to Example 4 was blue and contained dyestuff particles. The underlay was slightly greasy and stained after the rubber had been stored for only a few minutes at 25° C. on filter paper.

What is claimed is:

1. Colored silicone compositions comprising:
   (a) from about 60 to about 99%, based on the weight of (a) plus (b) of at least one organopolysiloxane,
   (b) from about 1 to about 30%, based on the weight of (a) plus (b) of at least one isoparaffin having 8 to 24 carbon atoms, and
   (c) a dyestuff soluble in (b).
2. Silicone composition according to claim 1 wherein the organopolysiloxane contains at least one moiety selected from the group consisting of trimethylsiloxy, hydroxyl, vinyl, allyl, acrylyl, methacrylyl, phenyl and Si-H.
3. Silicone composition according to claim 1 wherein component (b) is 2,2,4,4,6,6,8-heptamethylnonane, 2,2,4,4,6,6,8,8,10-nonanmethylundecane, or a mixture of both.

* * * * *